US012288651B2

(12) United States Patent
Hsu et al.

(10) Patent No.: US 12,288,651 B2
(45) Date of Patent: Apr. 29, 2025

(54) KEY STRUCTURE

(71) Applicant: PEGATRON CORPORATION, Taipei (TW)

(72) Inventors: Ta-Yung Hsu, Taipei (TW); Chun-Cheng Chang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 184 days.

(21) Appl. No.: 18/321,740

(22) Filed: May 22, 2023

(65) Prior Publication Data

US 2024/0029969 A1 Jan. 25, 2024

(30) Foreign Application Priority Data

Jul. 20, 2022 (TW) ................................. 111127116

(51) Int. Cl.
*H01H 13/14* (2006.01)
*H01H 13/20* (2006.01)

(52) U.S. Cl.
CPC ............ *H01H 13/14* (2013.01); *H01H 13/20* (2013.01)

(58) Field of Classification Search
CPC .. H01H 13/14; H01H 13/20; H01H 2221/036; H01H 2223/002; H01H 13/06; H01H 13/705; H01H 13/10; H01H 3/12
See application file for complete search history.

(56) References Cited

U.S. PATENT DOCUMENTS 4,136,269 A * 1/1979 Weidler ................. H05K 3/222 200/243
6,880,989 B2 * 4/2005 Sotome .................. G03B 21/28 200/345
8,283,587 B2 * 10/2012 Ouyang ............. H04M 1/0202 200/345
2009/0218207 A1 9/2009 Mou

FOREIGN PATENT DOCUMENTS

| | | | |
|---|---|---|---|
| CN | 208970390 | U | 6/2019 |
| CN | 111430166 | A | 7/2020 |
| CN | 215417951 | U | 1/2022 |
| CN | 216792695 | U | 6/2022 |
| JP | UP10125168 | A | 5/1998 |
| TW | M335778 | U | 7/2008 |
| TW | M452435 | U1 | 5/2013 |
| TW | M502943 | U | 6/2015 |
| TW | I493583 | B | 7/2015 |
| WO | WO2016031330 | A1 | 3/2016 |

* cited by examiner

*Primary Examiner* — Lheiren Mae A Caroc
(74) *Attorney, Agent, or Firm* — Li & Cai Intellectual Property (USA) Office

(57) ABSTRACT

A key structure is applicable to an electronic device having a housing. The key structure includes a seat, a switch, a button, and an elastic sheet. The seat is disposed in the housing and has a first through hole. The switch is disposed on the seat. A key pillar of the button passes through the first through hole to abut against the switch. The elastic sheet includes a body, and a plurality of first elastic arms, second elastic arms and third elastic arms. The first elastic arms extending from the body are abutting against the housing. The second elastic arms extending from an inner edge of the second through hole are engaged with the key pillar. The third elastic arms abutting against the keycap are configured to support the button and provide a restoring force that can restore the button from a pressed position to an initial position.

10 Claims, 13 Drawing Sheets

KEY STRUCTURE

CROSS-REFERENCE TO RELATED PATENT APPLICATION

This application claims the benefit of priority to Taiwan Patent Application No. 111127116, filed on Jul. 20, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a structure, and more particularly to a key structure.

BACKGROUND OF THE DISCLOSURE

Mostly, the buttons of a conventional electronic device are assembled from an inside of the conventional electronic device and an adhesive is used to assemble the buttons to the electronic device. However, the adhesive is required to be cured for a period of time and the residual adhesive should be cleaned up during the assembly process, such that a production efficiency is impacted accordingly. In addition, a bad reliability and an unstable quality is also occurred.

SUMMARY OF THE DISCLOSURE

In response to the above-referenced technical inadequacies, the present disclosure provides a key structure.

In one aspect, the present disclosure provides a key structure. The key structure is applicable to an electronic device having a housing, and the key structure includes a seat, a switch, a button, and an elastic sheet. The seat is disposed on an inner side of the housing, and the seat has a first through hole. The switch corresponds in position to the first through hole. The button has an initial position and a pressed position, and the button includes a keycap and a key pillar. The key pillar is connected to the keycap, and the key pillar passes through the first through hole to abut against the switch. The elastic sheet is sleeved on the button, and includes a body, a plurality of first elastic arms, a plurality of second elastic arms, and a plurality of third elastic arms. The body has a second through hole that corresponds in position to the first through hole, and the key pillar passes through the second through hole and the first through hole to be disposed on the seat. The first elastic arms extend from an outer edge of the body toward the housing. The first elastic arms are configured to abut against an inner surface of the housing. The second elastic arms extend from an inner edge of the second through hole in a direction away from the housing. The second elastic arms are engaged with the key pillar. The third elastic arms are connected to the outer edge of the body. The third elastic arms abut against a bottom surface of the keycap, so as to support the button and provide a restoring force that is configured to restore the button from the pressed position to the initial position.

Therefore, in the key structure provided by the present disclosure, by virtue of "the first elastic arms being configured to abut against an inner surface of the housing," "the second elastic arms being engaged with the key pillar," and "the third elastic arms abutting against a bottom surface of the keycap," the key structure can be directly assembled from an outside of the electronic device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
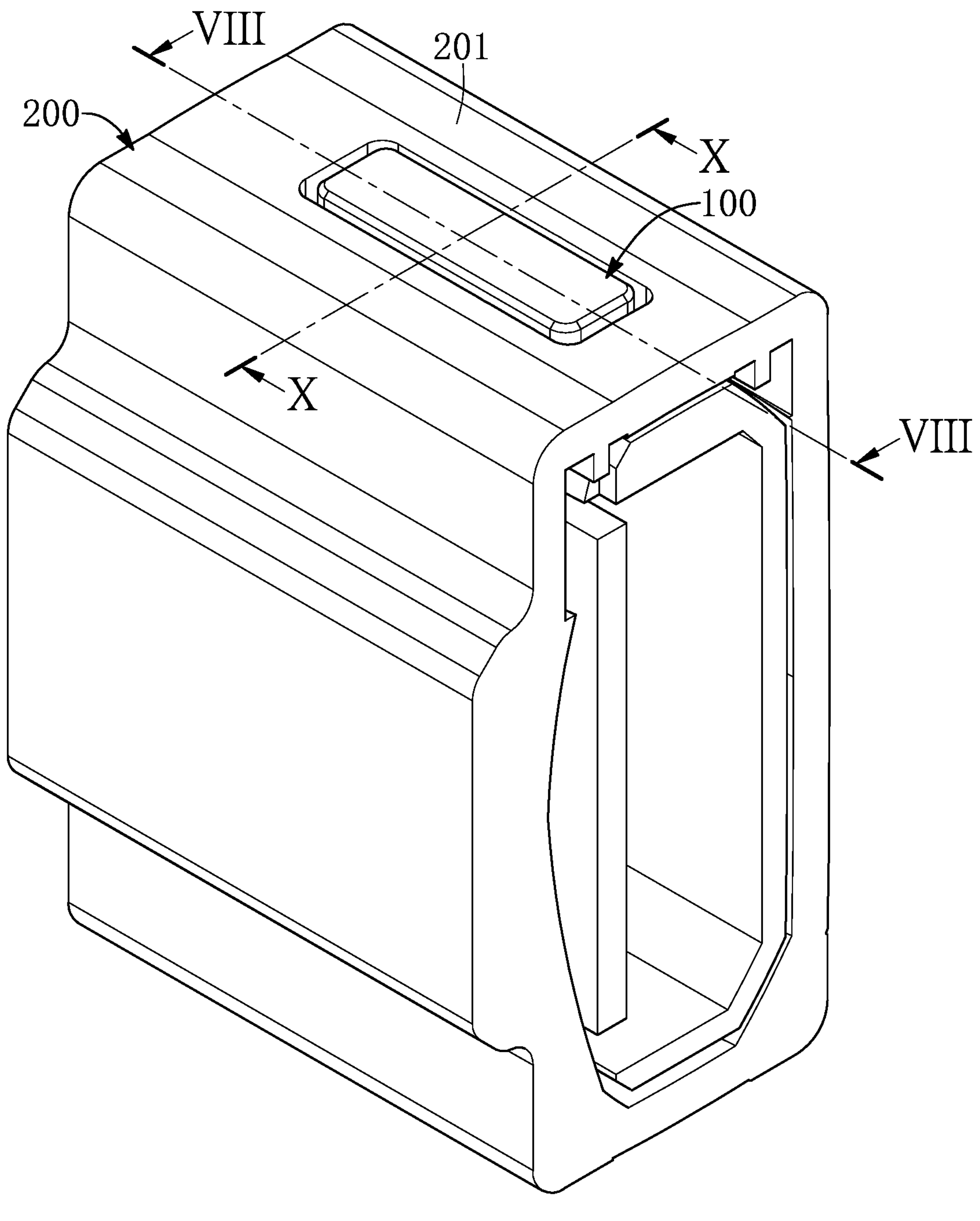
FIG. 1 is a schematic perspective view of a key structure according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
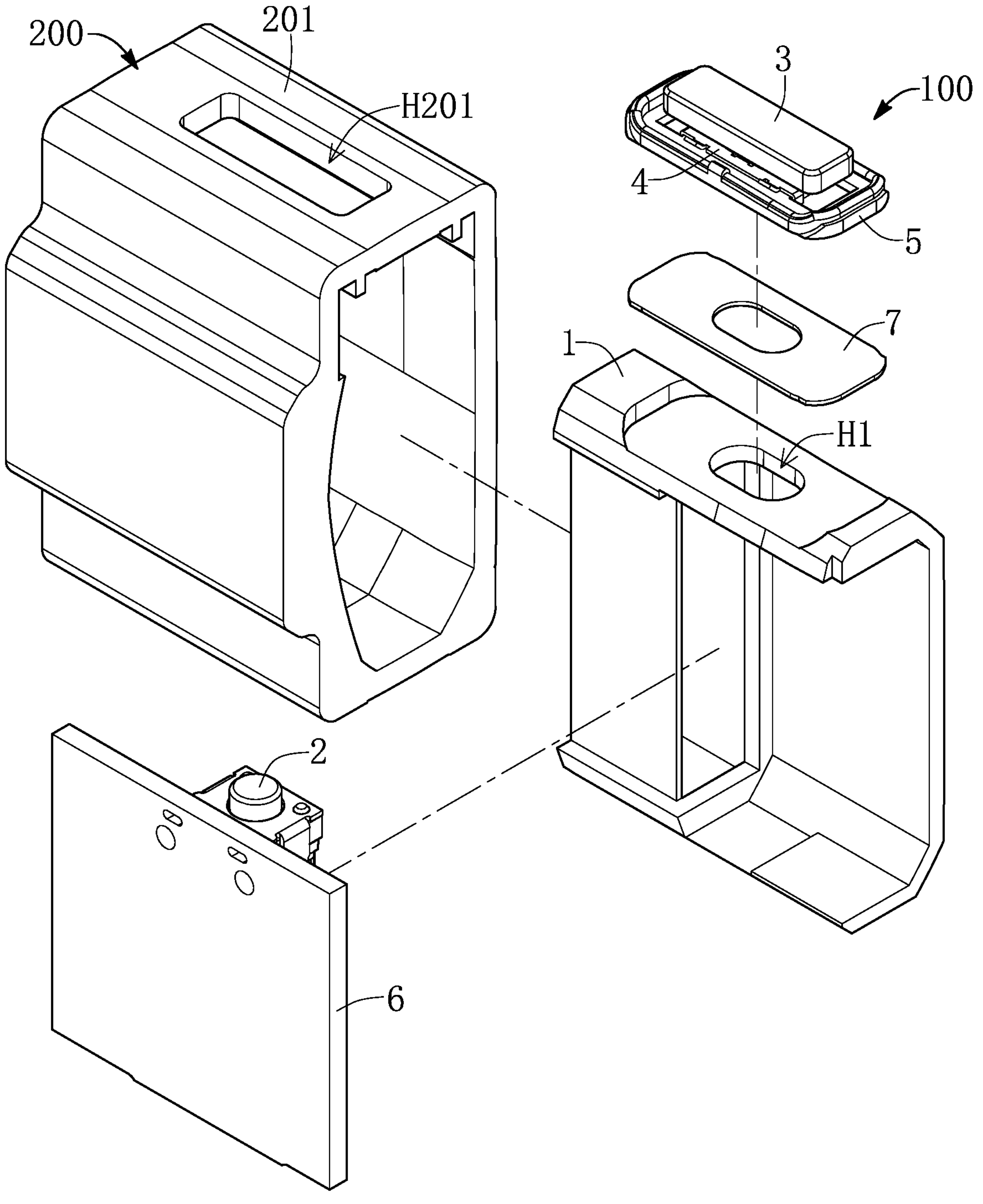
FIG. 2 is a schematic exploded view of the key structure according to the present disclosure.
Figure 3:
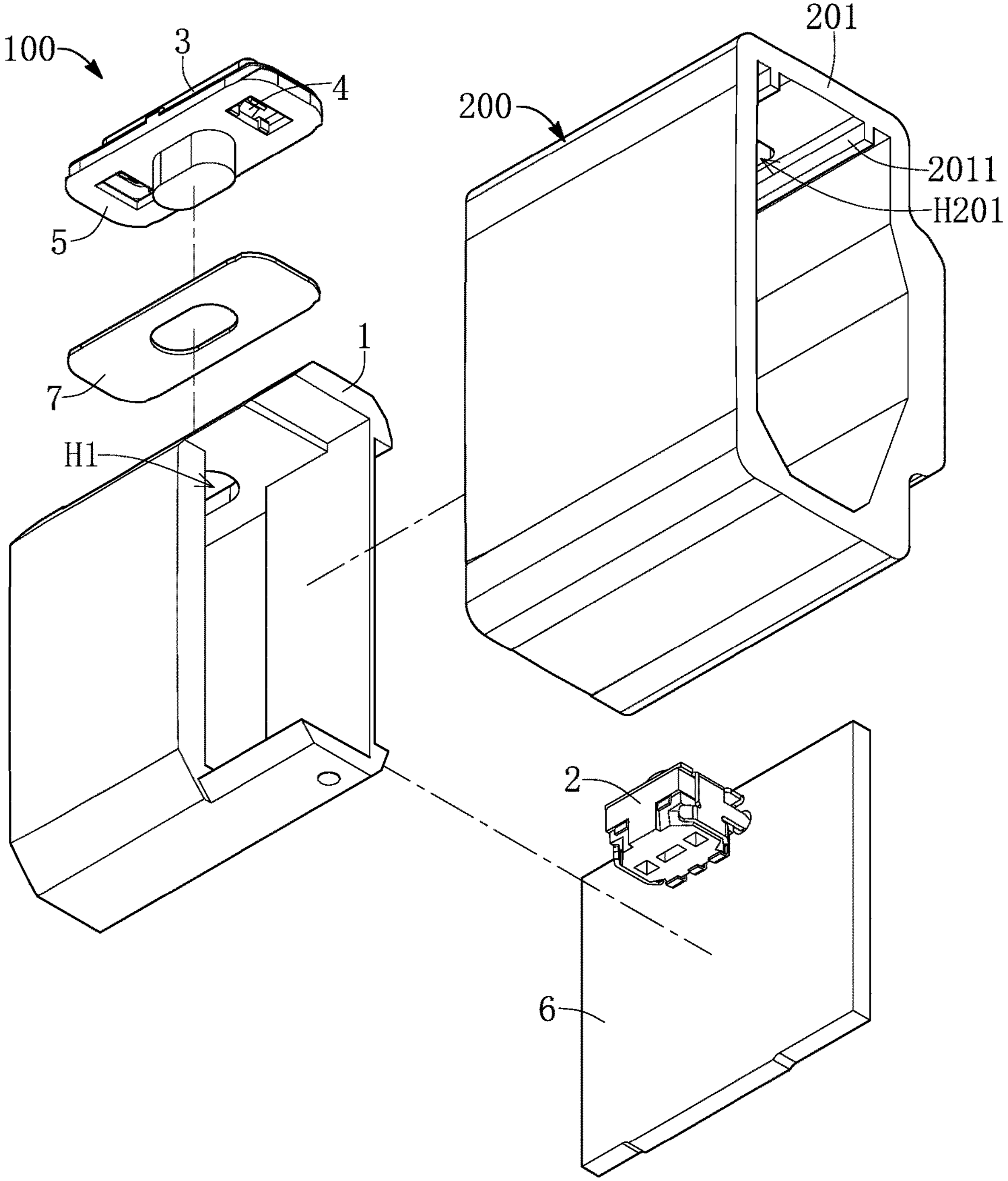
FIG. 3 is another schematic exploded view of the key structure according to the present disclosure.

Referring to FIG. 1 to FIG. 13, the present disclosure provides a key structure 100. As shown in FIG. 1 to FIG. 3, the key structure 100 is applicable to an electronic device 200 that includes a housing 201 (only a part of the electronic device 200 is shown in the drawings). The key structure 100 includes a seat 1 disposed on an inner side of the housing 201, a switch 2 disposed on the seat 1, a button 3 disposed on the seat 1, an elastic sheet 4 sleeved on the button 3, an elastic member 5 disposed on the seat 1, and a circuit board 6 located on one side of the seat 1.

It should be noted that the seat 1, the switch 2, the button 3, the elastic sheet 4, the elastic member 5, and the circuit board 6 in the present embodiment are jointly defined as the key structure 100, but the present disclosure is not limited thereto. For example, the key structure 100 can also be implemented by only including the seat 1, the switch 2, the button 3, and the elastic sheet 4. The following description describes the structure and connection relationship of each component of the key structure 100.

Figure 9:
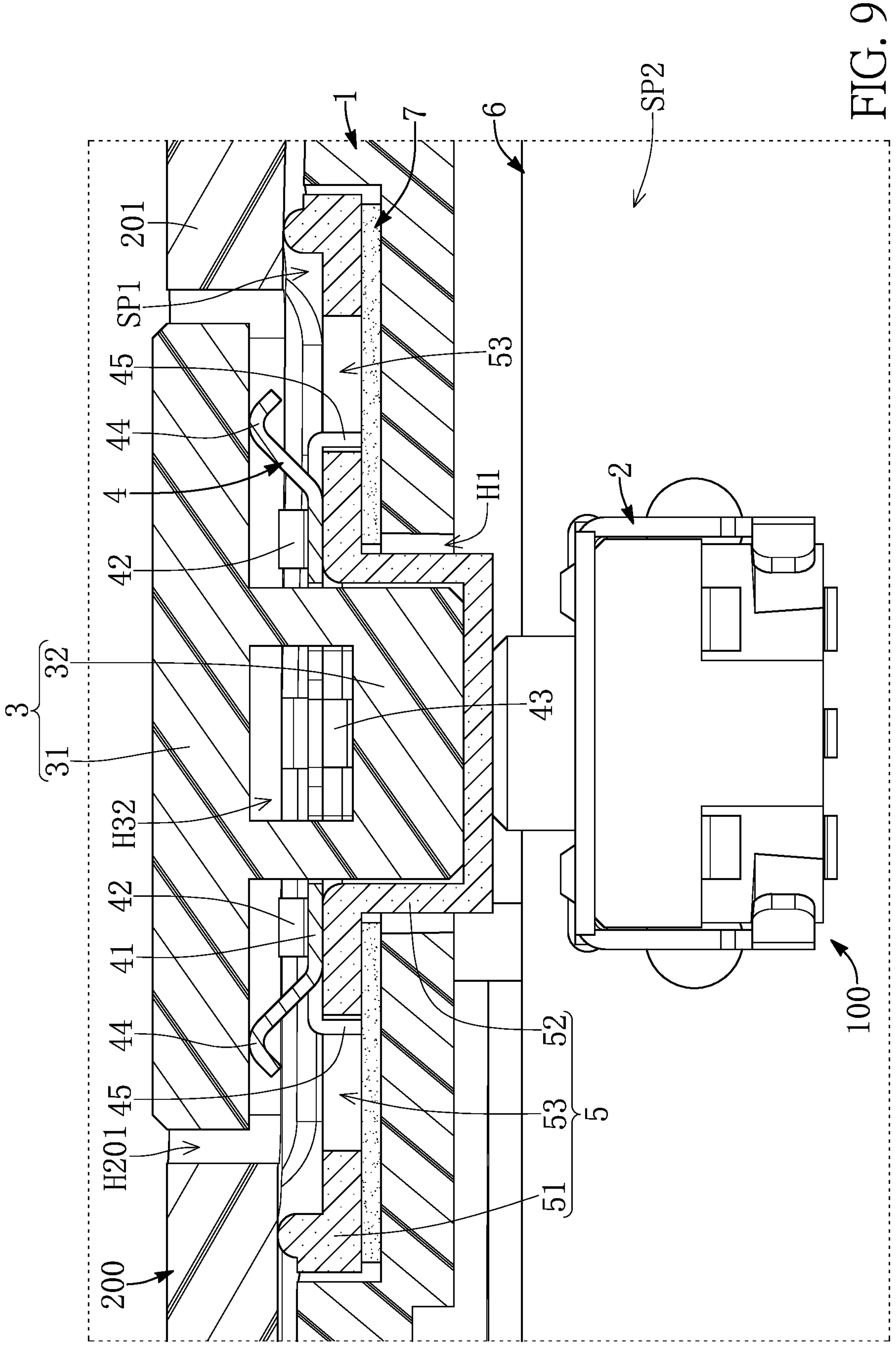
FIG. 9 is a schematic enlarged view of section IX of FIG. 8.

Referring to FIG. 2, FIG. 3, and FIG. 9, the housing 201 includes a limiting portion 2011, the seat 1 is disposed in the housing 201 and is restricted by the limiting portion 2011 of the housing 201, so as to maintain a positional relationship between the housing 201 and the seat 1. An installation space SP1 (as shown in FIG. 9) is formed between the seat 1 and the housing 201, and the installation space SP1 is provided for accommodating the elastic sheet 4 and the elastic member 5. The seat 1 has a first through hole H1 corresponding in position to an accommodating hole H201 of the housing 201, and the first through hole H1 and the accommodating hole H201 are in spatial communication with the installation space SP1.

The switch 2 is disposed on the circuit board 6 and electrically connected to the circuit board 6, the circuit board 6 is located on one side of the seat 1, and the switch 2 corresponds in position to the first through hole H1.

Figure 5:
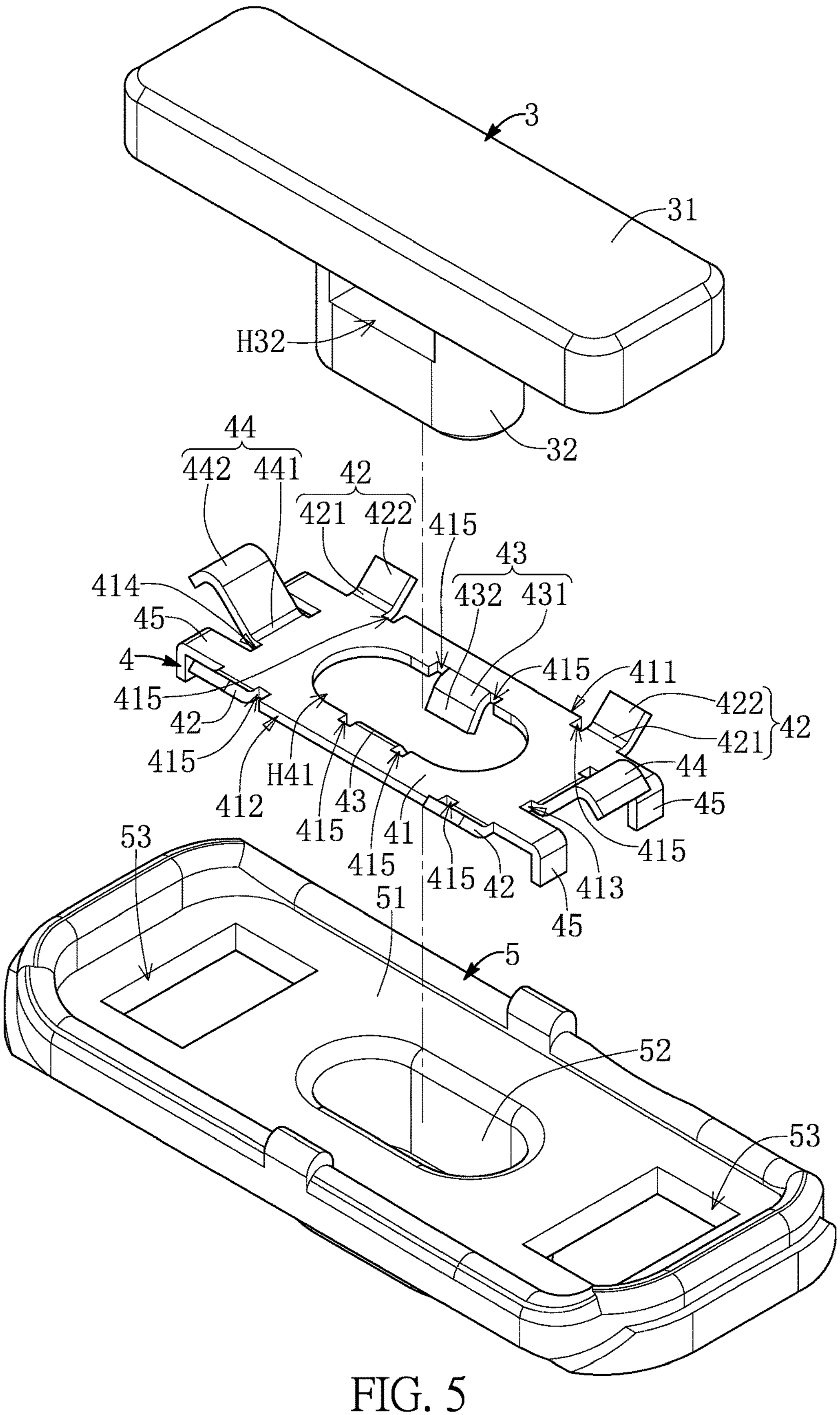
FIG. 5 is a schematic partially exploded view of the key structure according to the present disclosure.
Figure 6:
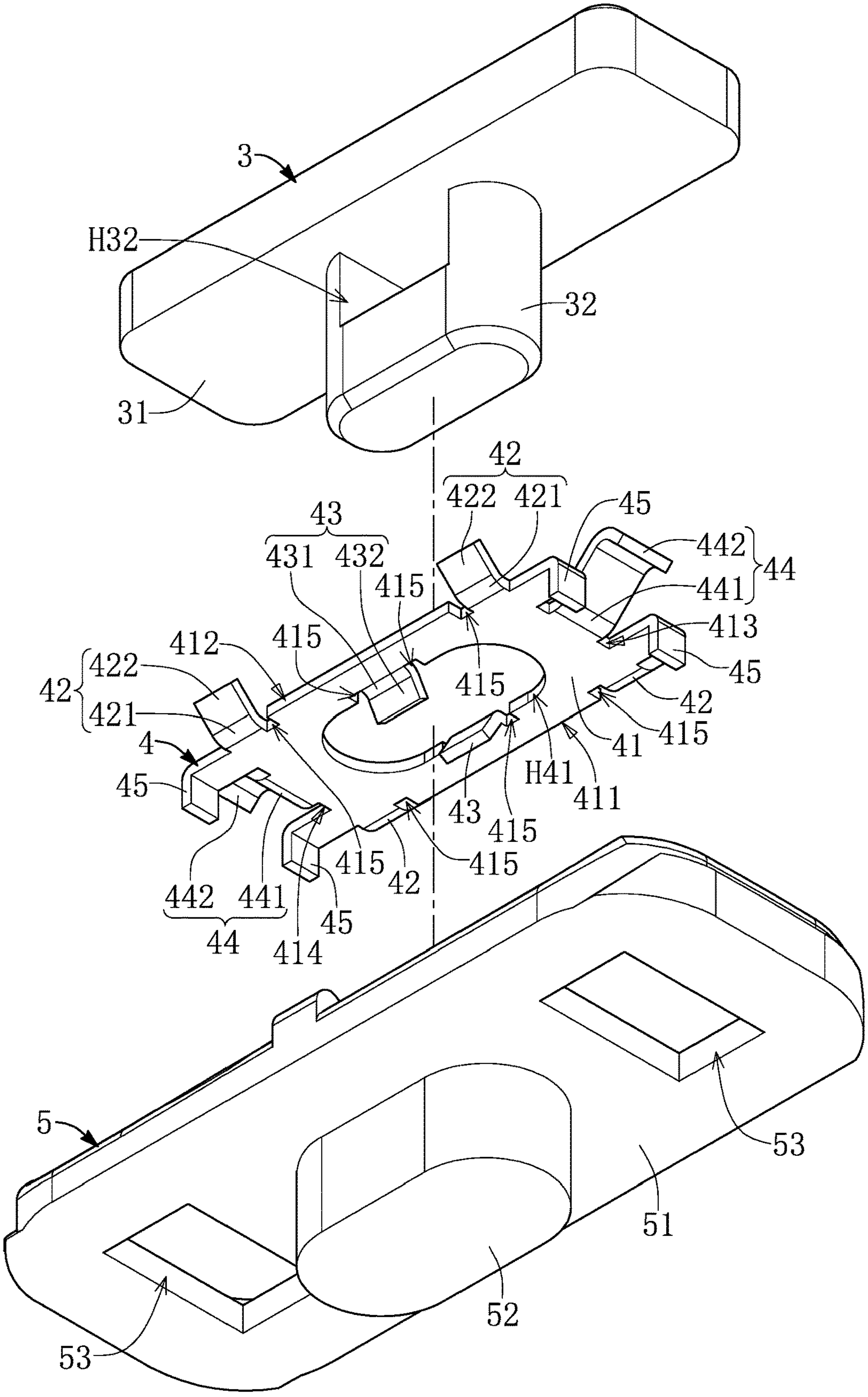
FIG. 6 is another schematic partially exploded view of the key structure according to the present disclosure.
Figure 11:
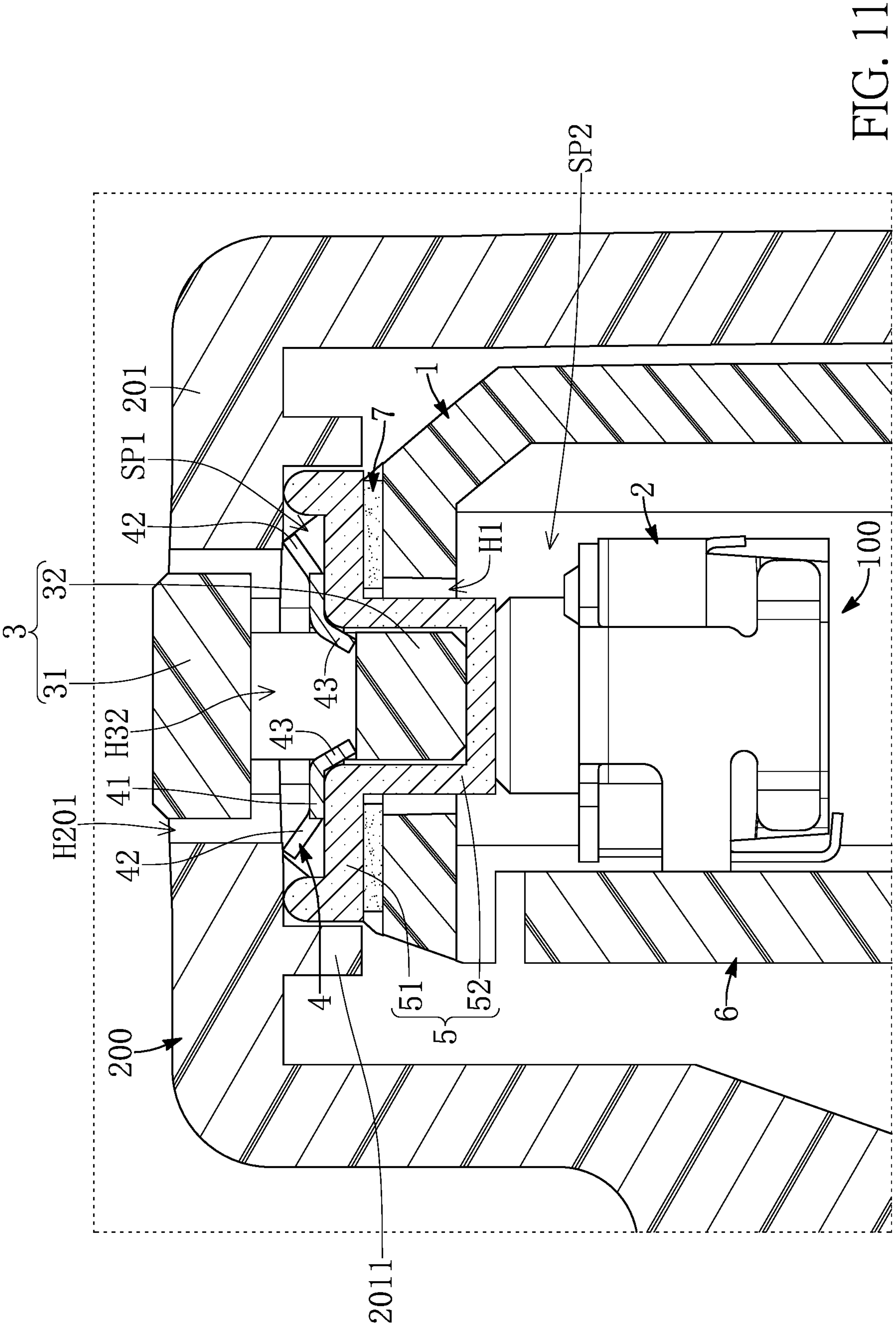
FIG. 11 is a schematic enlarged view of section XI of FIG. 10.

In addition, referring to FIG. 5, FIG. 6, and FIG. 11, the button 3 in the present embodiment includes a keycap 31 and a key pillar 32. The keycap 31 is accommodated in the accommodating hole H201 of the housing 201, and the keycap 31 can pass through the accommodating hole H201 to be exposed outside the housing 201, so as to allow a user to press the button 3. The key pillar 32 extends from the keycap 31, and the key pillar 32 passes through the first through hole H1 of the seat 1 (and the elastic sheet 4) to abut against the switch 2. Moreover, the key pillar 32 also has a buckle hole H32. In another embodiment of the present disclosure (not shown in the figures), two sides of the key pillar 32 may have an engagement structure, but the present disclosure is not limited thereto. The key pillar 32 of the present disclosure can be configured to implement a locking function through the buckle hole H32, the engagement structure, or other designs.

Figure 7:
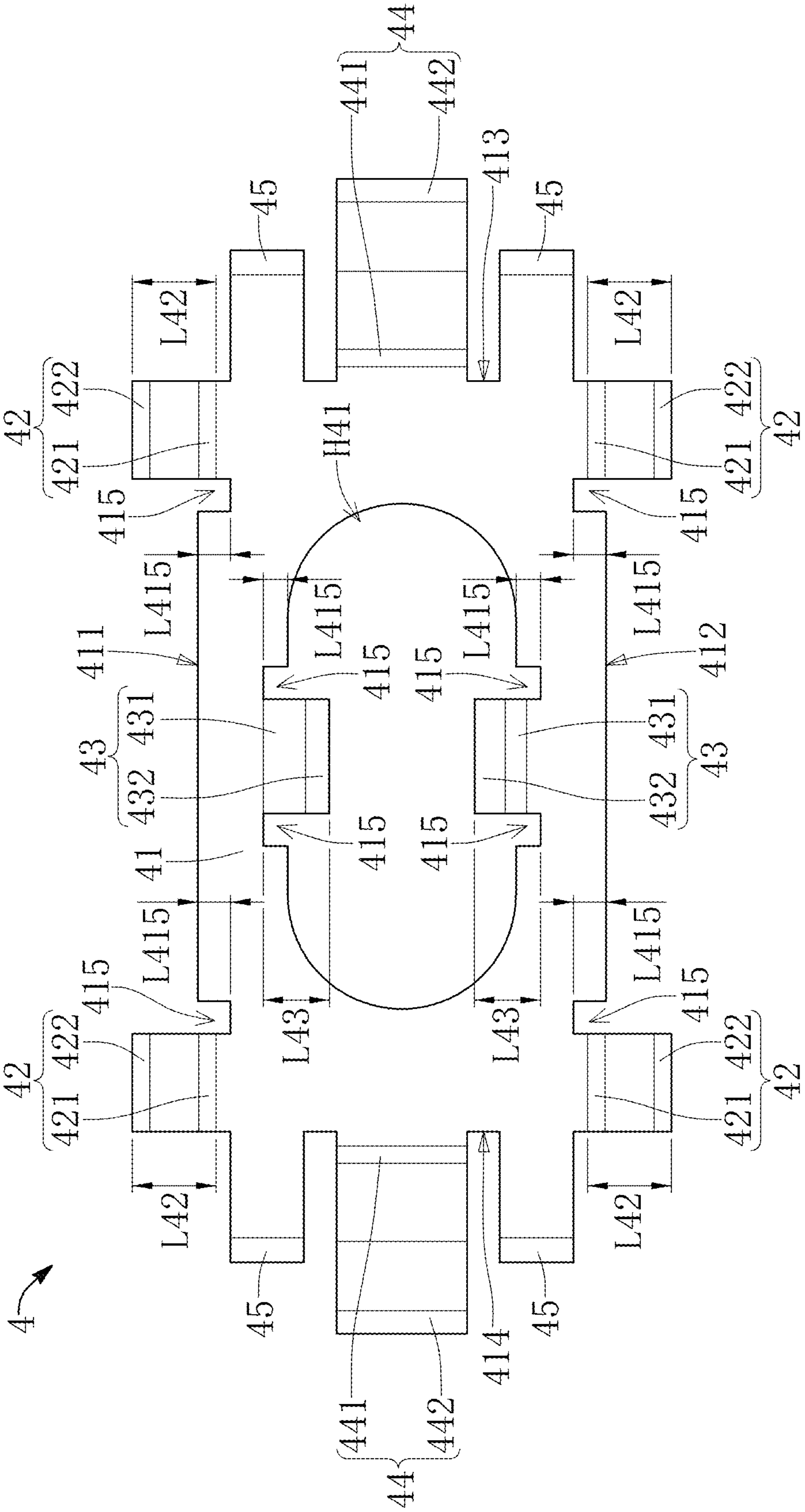
FIG. 7 is a schematic top view of the elastic sheet according to the present disclosure.
Figure 8:
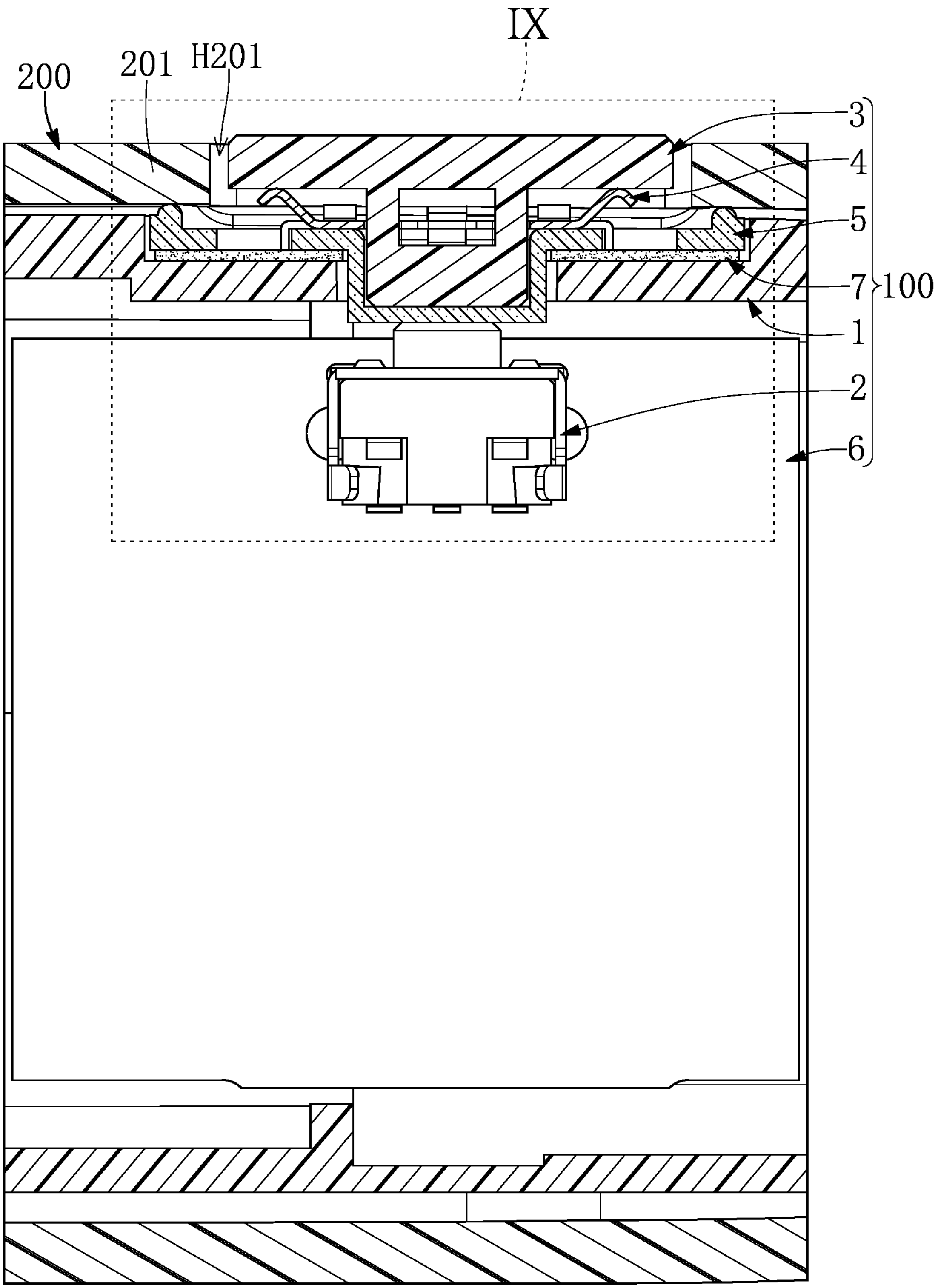
FIG. 8 is a schematic cross-sectional view taken along line VIII-VIII of FIG. 1.

Referring to FIG. 5 to FIG. 7, the elastic sheet 4 includes a body 41, a plurality of first elastic arms 42, a plurality of second elastic arms 43, and a plurality of third elastic arms 44 that are connected to the body 41. The elastic sheet 4 in the present embodiment can be a metal plate-like spring, the body 41 has a second through hole H41 corresponding in position to the first through hole H1, and the second through hole H41 can allow the key pillar 32 to pass therethrough, so that the switch 2 can be triggered through the key pillar 32 (as shown in FIG. 11).

Figure 10:
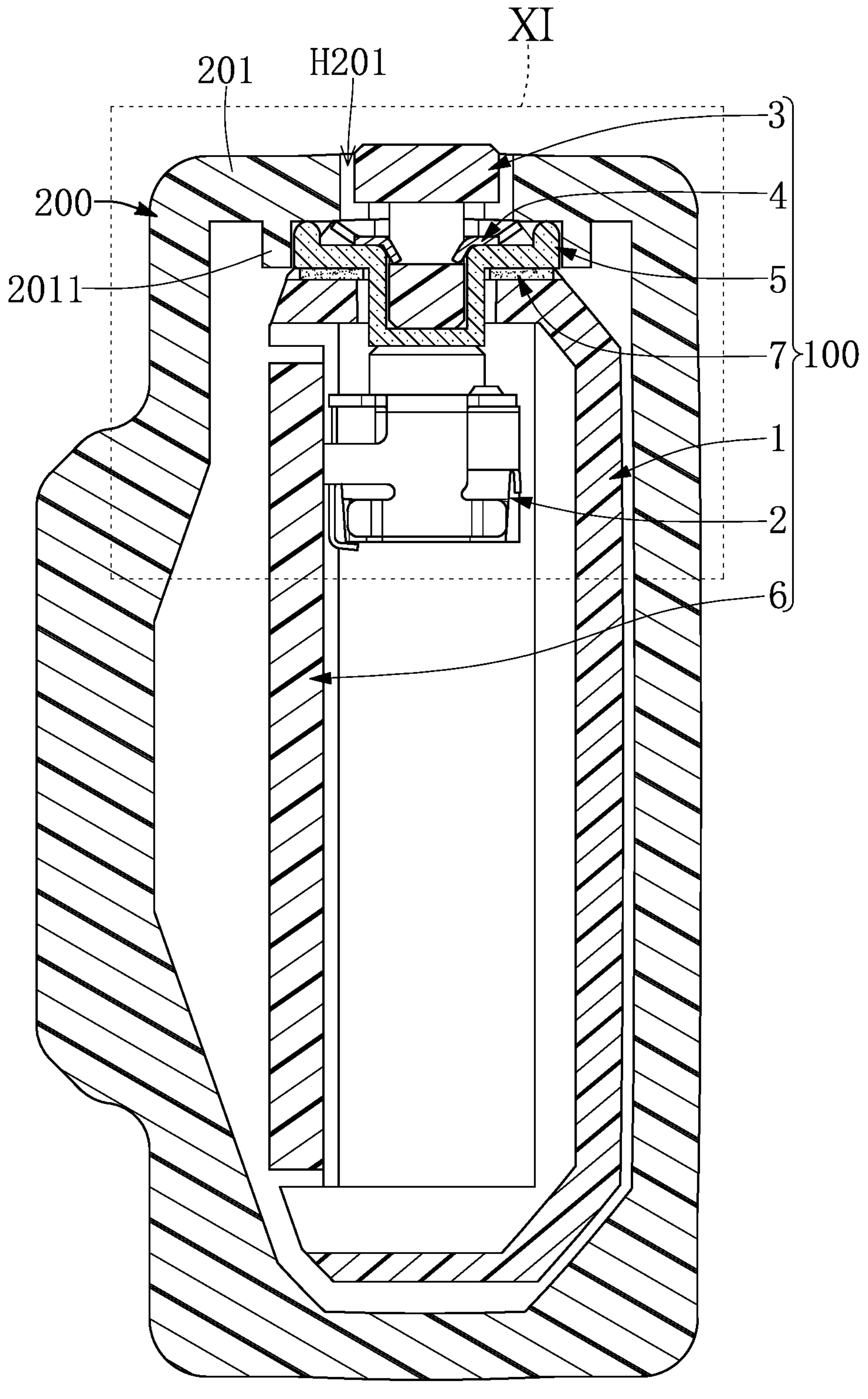
FIG. 10 is a schematic cross-sectional view taken along line X-X of FIG. 1.

Referring to FIG. 7, FIG. 9, and FIG. 11, the first elastic arms 42 extend from an outer edge of the body 41 toward the housing 201 (i.e., an upward direction as in FIG. 11, or a direction away from the switch 2). The first elastic arms 42 may include four first elastic arms 42 that are arranged symmetrically (e.g., the four first elastic arms 42 are symmetrically arranged on the outer edge of the body 41 and around the accommodating hole H201), so as to be used to abut against an inner surface of the housing 201 and the abutting positions of the first elastic arms 42 are located around an outer edge of an accommodating hole H201. That is to say, the elastic sheet 4 is stably disposed in the housing 201 through the first elastic arms 42. As shown in FIG. 10, when an external pulling force is applied on the button 3, the button 3 will not be separated from the housing 201 due to the first elastic arms 42 abutting against the housing 201. In addition, the second elastic arms 43 are extending from an inner edge of the second through hole H41 toward a direction away from the housing 201 (i.e., a direction toward the switch 2), and the second elastic arms 43 are engaged with the buckle holes H32 of the key pillar 32. Accordingly, the button 3 is positioned in the accommodating hole H201 of the housing 201 by the first elastic arms 42 and the second elastic arms 43 of the elastic sheet 4, so that the button 3 will not be separated from the accommodation hole H201 of the housing 201.

Preferably, referring to FIG. 5 to FIG. 7, the body 41 has a first side edge 411 and a second side edge 412 opposite to each other, and a third side edge 413 and a fourth side edge 414 that is opposite to the first side edge 411 and the second side edge 412. The first elastic arms 42 are disposed on the first side edge 411 and the second side edge 412 of the body 41 respectively, so as to abut against the inner surface of the housing 201. The second elastic arms 43 are disposed on an inner edge of the second through hole H41 corresponding in position to the first side edge 411 and the second side edge 412 (i.e., symmetrically disposed on the inner edge of the second through hole H41), so as to engage the buckle hole H32, but the present disclosure is not limited thereto.

It should be noted that, in the present embodiment, each of the first elastic arms 42 has a curved segment 421 connected to the body 41 and an extension segment 422 connected to the curved segment 421, and each of the second elastic arms 43 has a curved segment 431 connected to the body 41 and an extension segment 432 connected to the curved segment 431. The body 41 also has a plurality of grooves 415 that are formed on two sides of each curved segments 421, 431. Namely, the grooves 415 are formed by indenting the first side edge 411, the second side edge 412, and the inner edge of the second through hole H41. As shown in FIG. 7, a length L415 of the groove 415 is less than or equal to a half of a length L42 of the first or the second elastic arms 42, 43. Naturally, the grooves 415 of the body 41 can be omitted according to practical requirements.

Figure 12:
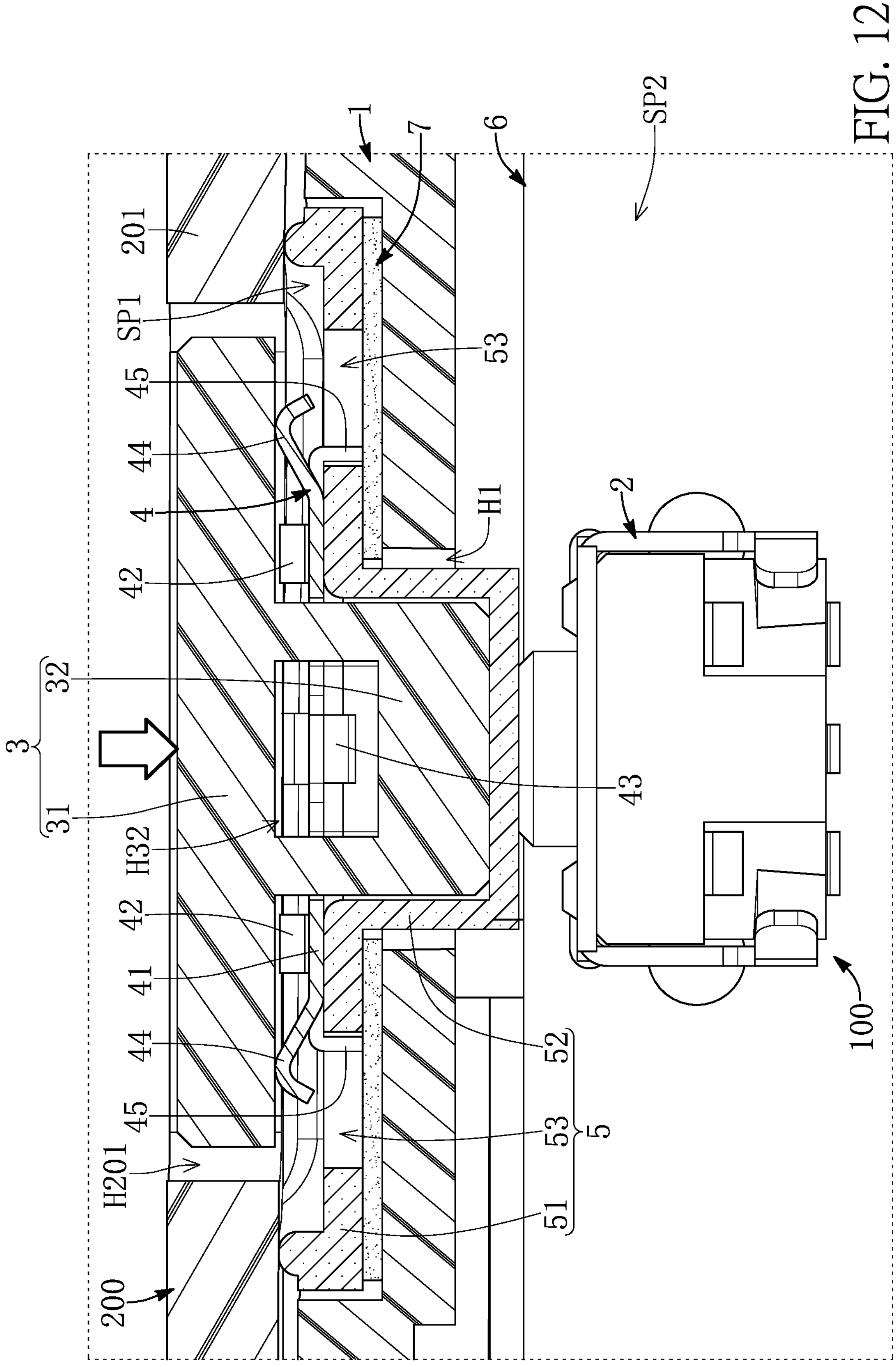
FIG. 12 is a schematic view showing the button being pressed according to the present disclosure.
Figure 13:
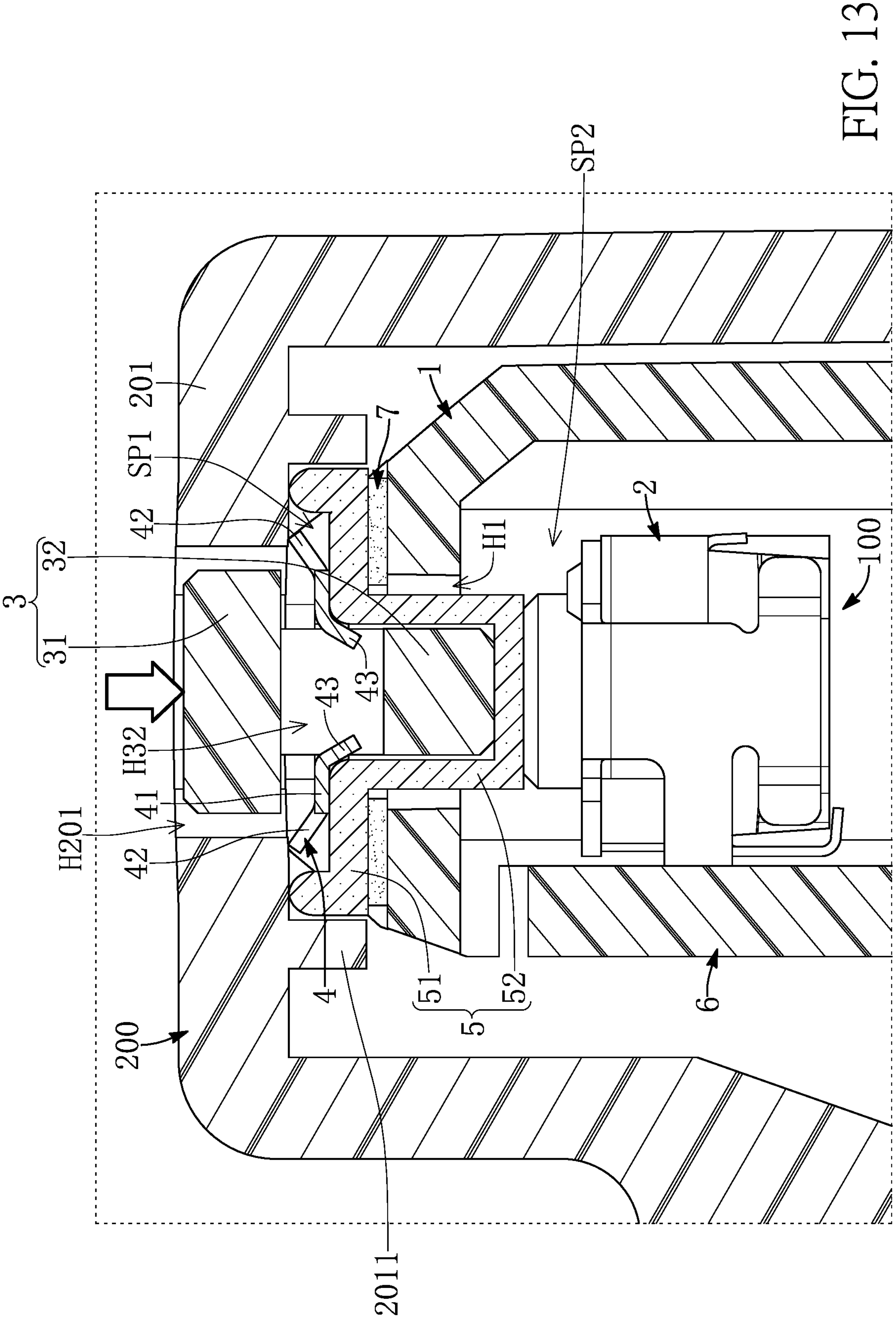
FIG. 13 is another schematic view showing the button being pressed according to the present disclosure.

Referring to FIG. 5 to FIG. 11, the two third elastic arms 44 are formed on the body 41, and the two third elastic arms 44 respectively extend from the third side edge 413 and the fourth side edge 414 of the body 41 toward the housing 201 (i.e., an upward direction as in FIG. 11, or a direction away from the switch 2). The two third elastic arms 44 abut against a bottom surface of the keycap 31, so as to support the button 3 in an initial position (as shown in FIG. 9). When the button 3 is pressed (as shown in FIG. 12) by a user, the key pillar 32 abuts against the switch 2 and the two third elastic arms 44 are deformed to provide a restoring force for the button 3, so that the button 3 can be moved from a pressed position (as shown in FIG. 12) to the initial position by the restoring force.

Further, as shown in FIG. 4 to FIG. 7, each of the third elastic arms 44 has a first segment 441 and a second segment 442 having a length shorter than a length of the first segment 441. One end of the first segment 441 is connected to the body 41, and the other end of the first segment 441 is connected to one end of the second segment 442. The second segment 442 is not parallel to the first segment 441. Therefore, the third elastic arms 44 can be used to support the keycap 3 at the junction between the first segment 441 and the second segment 442. Naturally, the length of the first segment 441 and the length of the second segment 442 can be adjusted according to practical requirements, but the present disclosure is not limited thereto.

Figure 4:
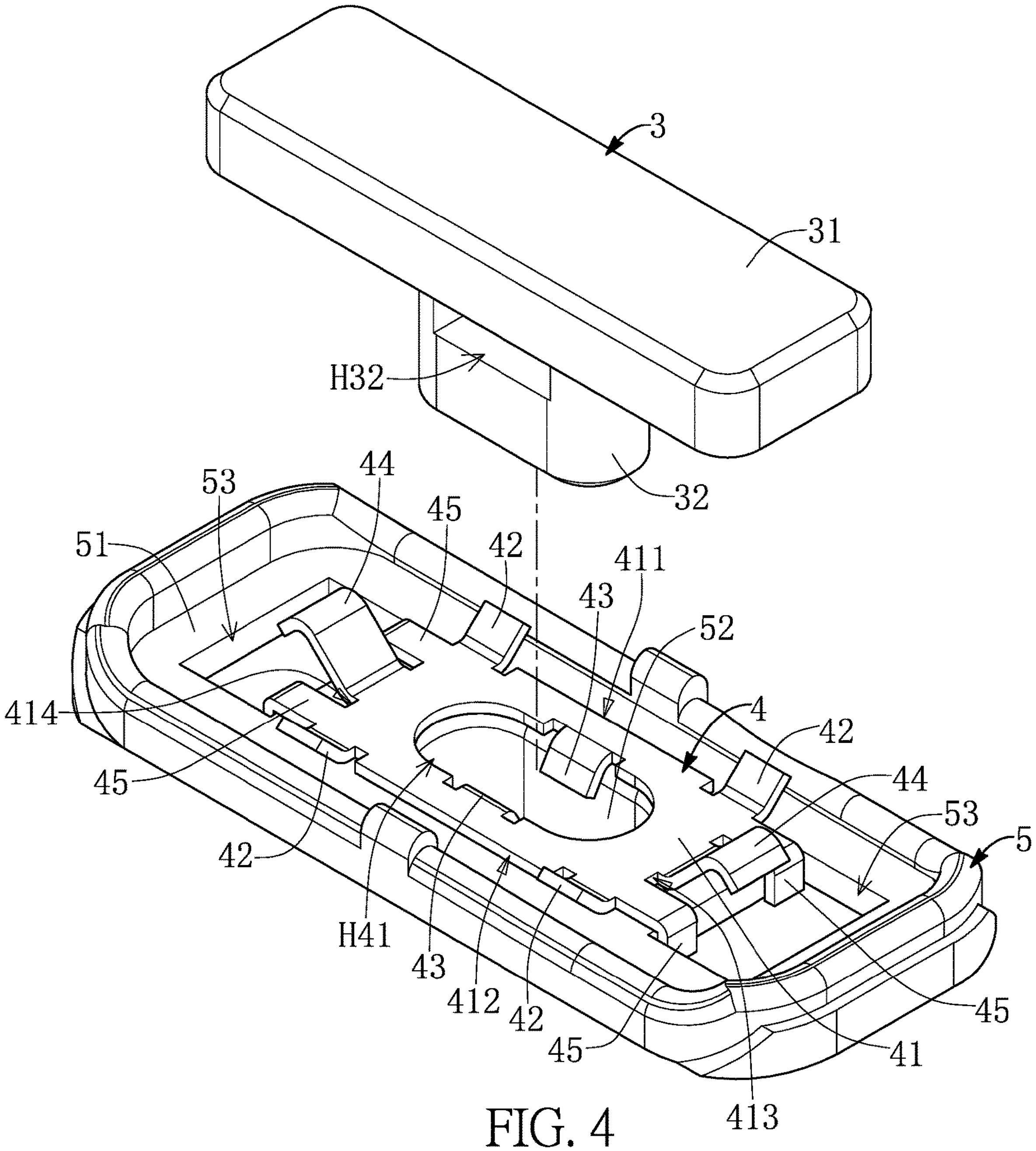
FIG. 4 is a schematic perspective view showing an elastic sheet and an elastic member being separated from a button according to the present disclosure.

In addition, a junction between the first segment 441 and the second segment 442 of each of the third elastic arms is preferably designed to be chamfered or rounded (as shown in FIG. 4 and FIG. 9), so that the third elastic arms 44 are configured to abut against the keycap 31 stably, but the present disclosure is not limited thereto. For example, in another embodiment of the present disclosure (not shown in the figures), each of the third elastic arms 44 can be designed to have a right angle at the junction between the first segment 441 and the second segment 442, or the second segment 442 of each of the third elastic arms 44 can be omitted (i.e., one end of the first segments 441 of the third elastic arms 44 is abutting against the keycap 31).

Referring to FIG. 5, FIG. 6, and FIG. 9, the elastic member 5 can be an elastic rubber, and is disposed on one side of the seat 1 facing the housing 201 by an adhesive layer 7 of the key structure. The elastic member 5 blocks two spaces on two sides of the first through hole H1 on the seat 1 (i.e., an installation space SP1 of the seat 1 in FIG. 9 and FIG. 11 and an inner space SP2 of the seat 1), so that an external space is not in spatial communication with the internal space SP2, thereby allowing the internal space SP2 to be dustproof, waterproof, etc. Although the elastic member 5 is an elastic rubber as an example, the present disclosure is not limited thereto.

More specifically, the elastic member 5 includes a carrying portion 51 and an accommodating portion 52 that is connected to the carrying portion 51. In the present embodiment, the carrying portion 51 is a plate-like structure and is fixed on the seat 1 (e.g., by covering) to carry the elastic sheet 4, and the accommodating portion 52 is used for accommodating the key pillar 32.

In a practical application, the carrying portion 51 has two notches 53 that are respectively located on two sides of the accommodating portion 52, and the accommodating portion 52 corresponds in position to the first through hole H1 of the seat 1. Therefore, the accommodating portion 52 of the elastic member 5 can pass through the first through hole H1 of the seat 1 to place the elastic member 5 on the seat 1. The elastic sheet 4 includes a plurality of limiting arms 45 connected to the body 41. The limiting arms 45 respectively extend from the third side edge 413 and the fourth side edge 414 of the body 41 toward the elastic member 5, and the limiting arms 45 respectively abut against inner edges of the two notches 53, so that the elastic sheet 4 can be limited or fixed on the elastic member 5 (as shown in FIG. 4), but the present disclosure is not limited thereto.

For example, in another embodiment of the present disclosure (not shown in the figures), the two notches 53 of the elastic member 5 and the limiting arms 45 of the elastic sheet 4 can be omitted, and the elastic sheet 4 is directly fixed on the elastic member 5 by clamping or other manners.

Referring to FIG. 5, FIG. 6, and FIG. 9, the accommodating portion 52 extends from the carrying portion 51 toward the first through hole H1, and the accommodating portion 52 passes through the first through hole H1 and corresponds in position to the switch 2. The accommodating portion 52 can be used for accommodating the key pillar 32, and the key pillar 32 can pass through the first through hole H1, so as to indirectly abut against the switch 2 through the accommodating portion 52.

It should be noted that, in another embodiment of the present disclosure (not shown in the figures), the elastic member 5 of the key structure 100 can be omitted according to practical requirements. In other words, the elastic sheet 4 can be directly fixed on the seat 1. For example, the seat 1 has two notches, and the limiting arms 45 of the elastic sheet 4 directly abut against the inner edge of the seat 1 on the two notches 53. In another example, the elastic sheet 4 is directly clamped on the seat 1, or fixed on the seat 1 in other manners.

In addition, in a practical installation of the key structure in the embodiment of the present disclosure, the elastic sheet 4 is first installed on the elastic member 5, and the elastic member 5 is fixed on the seat 1 by the adhesive layer 7. Then, the seat 1 and the circuit board 6 having the switch 2 are arranged into the housing 201. Finally, the button 3 is disposed on the accommodating hole H201 via the exterior of the housing 201.

Beneficial Effects of the Embodiment

In conclusion, in the key structure provided by the present disclosure, by virtue of "the first elastic arms being configured to abut against an inner surface of the housing," "the second elastic arms being engaged with the key pillar," and "the third elastic arms abutting against a bottom surface of the keycap," the key structure can be directly assembled from an outside of the electronic device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A key structure, applicable to an electronic device having a housing, the key structure comprising:

- a seat disposed on an inner side of the housing, wherein the seat has a first through hole;
- a switch corresponding in position to the first through hole;

a button having an initial position and a pressed position, wherein the button includes:

a keycap; and a key pillar connected to the keycap, wherein the key pillar passes through the first through hole to abut against the switch; and an elastic sheet sleeved on the button, and including:

a body having a second through hole that corresponds in position to the first through hole, wherein the key pillar passes through the second through hole and the first through hole to be disposed on the seat;

a plurality of first elastic arms extending from an outer edge of the body toward the housing, wherein the first elastic arms are configured to abut against an inner surface of the housing;

a plurality of second elastic arms extending from an inner edge of the second through hole in a direction away from the housing, wherein the second elastic arms are engaged with the key pillar; and a plurality of third elastic arms connected to the outer edge of the body, wherein the third elastic arms abut against a bottom surface of the keycap, so as to support the button and provide a restoring force that is configured to restore the button from the pressed position to the initial position.

2. The key structure according to claim 1, further comprising an elastic member, wherein the elastic member is disposed on one side of the seat facing the housing, and the elastic member blocks two spaces respectively defined on two sides of the first through hole.

3. The key structure according to claim 2, wherein the elastic member includes a carrying portion and an accommodating portion that is connected to the carrying portion, the carrying portion is configured to carry the elastic sheet, and the accommodating portion is configured to accommodate the key pillar, and wherein the key pillar and the accommodating portion of the elastic member are jointly passing through the first through hole to abut against the switch.

4. The key structure according to claim 3, wherein the carrying portion has two notches, and the elastic sheet includes a plurality of limiting arms connected to the body, and wherein the limiting arms respectively abut against inner edges of the two notches of the carrying portion to limit the elastic sheet.

5. The key structure according to claim 1, wherein the key pillar has a buckle hole, and the second elastic arms are engaged with the buckle hole of the key pillar.

6. The key structure according to claim 1, wherein the body is in a rectangular shape and has a first side edge and a second side edge opposite to each other, and a third side edge and a fourth side edge that are opposite to the first side edge and the second side edge, wherein the first elastic arms extending from an outer edge of the first side edge and an outer edge of the second side edge respectively are extending toward the housing, the second elastic arms extending from an inner edge of the second through hole are disposed corresponding in position to the first side edge and the second side edge in the direction away from the housing, and wherein the third elastic arms extending from the third side edge and the fourth side edge respectively are extending toward the housing.

7. The key structure according to claim 1, wherein each of the third elastic arms has a first segment and a second segment connected to the first segment, one end of the first segment is connected to the body, the second segment is not parallel to the first segment, and a length of the second segment is less than that of the first segment.

8. The key structure according to claim 7, wherein the third elastic arms connected to the outer edge of the body are in a symmetrical arrangement, and a junction between the first segment and the second segment of each of the third elastic arms is chamfered or rounded.

9. The key structure according to claim 1, wherein the first elastic arms extending from an outer edge of the body are in a symmetrical arrangement, and abutting positions of the first elastic arms that are provided for abutting against the inner surface of the housing are symmetrically located on an outer edge of an accommodating hole.

10. The key structure according to claim 1, further comprising a circuit board, wherein the switch is disposed on the circuit board, and the circuit board is disposed on one side of the seat.

* * * * *